(12) United States Patent
Mura et al.

(10) Patent No.: US 12,316,405 B2
(45) Date of Patent: May 27, 2025

(54) POWER EFFICIENT TRANSMIT DIVERSITY

(71) Applicant: MOTOROLA MOBILITY LLC, Wilmington, DE (US)

(72) Inventors: John R Mura, Clarendon Hills, IL (US); Armin W Klomsdorf, Chicago, IL (US); Colin Frank, Park Ridge, IL (US)

(73) Assignee: Motorola Mobility LLC, Chicago, IL (US)

( * ) Notice: Subject to any disclaimer, the term of this patent is extended or adjusted under 35 U.S.C. 154(b) by 336 days.

(21) Appl. No.: 17/748,286

(22) Filed: May 19, 2022

(65) Prior Publication Data
US 2023/0379832 A1  Nov. 23, 2023

(51) Int. Cl.
 *H04B 7/0404* (2017.01)
 *H04B 7/06* (2006.01)
 *H04W 52/14* (2009.01)
 *H04W 52/20* (2009.01)

(52) U.S. Cl.
 CPC ......... *H04B 7/0404* (2013.01); *H04B 7/0693* (2013.01); *H04W 52/146* (2013.01); *H04W 52/20* (2013.01)

(58) Field of Classification Search
None
See application file for complete search history.

(56) References Cited

U.S. PATENT DOCUMENTS

| | | | | |
|---|---|---|---|---|
| 6,842,487 B1* | 1/2005 | Larsson | ................... | H04L 1/06 455/10 |
| 11,115,511 B1* | 9/2021 | Ghaemi | ............... | H04B 7/0602 |
| 12,191,961 B2* | 1/2025 | Frank | ................... | H04B 7/0671 |
| 2005/0249174 A1* | 11/2005 | Lundby | ............... | H04L 27/2602 370/338 |
| 2005/0259567 A1* | 11/2005 | Webster | ............... | H04B 7/0671 370/208 |
| 2006/0268165 A1* | 11/2006 | van Nee | ............. | H04B 7/0671 348/388.1 |
| 2011/0286347 A1* | 11/2011 | Mohanty | .............. | H04B 7/0689 370/252 |
| 2012/0033750 A1* | 2/2012 | Nikaein | ................ | H04L 1/0007 375/260 |

(Continued)

FOREIGN PATENT DOCUMENTS

| | | | | |
|---|---|---|---|---|
| KR | 20170042130 A | * | 4/2017 | |
| WO | WO-2015096140 A1 | * | 7/2015 | .......... H04W 52/362 |

OTHER PUBLICATIONS

English translation of KR 20170042130 (Year: 2024).*
English translation of WO2015096140 (Year: 2024).*

*Primary Examiner* — Gennadiy Tsvey
(74) *Attorney, Agent, or Firm* — Isidore PLLC

(57) ABSTRACT

A communication device, method, and computer program product provide power efficient transmit diversity using two transmit chains to meet a transmit power level for an uplink signal when one transmit chain is insufficient. In response to determining that the first transmit power level is equal to or less than the transmit power capability of at least one of a first transmit chain and a second transmit chain, the communication device configures a corresponding one of the first transmit chain and the second transmit chain to transmit the uplink channel with at least the first transmit power level.

20 Claims, 5 Drawing Sheets

(56) References Cited

U.S. PATENT DOCUMENTS

| | | | |
|---|---|---|---|
| 2012/0106490 A1* | 5/2012 | Nakashima | H04W 52/42 |
| | | | 370/329 |
| 2014/0056376 A1* | 2/2014 | Guo | H04B 7/0404 |
| | | | 375/267 |
| 2019/0158137 A1* | 5/2019 | Brunel | H04B 1/04 |
| 2019/0393944 A1* | 12/2019 | Huang | H04W 72/044 |
| 2022/0361118 A1* | 11/2022 | Lee | H04W 52/242 |
| 2024/0196342 A1* | 6/2024 | Lamm | H04W 52/365 |

* cited by examiner

POWER EFFICIENT TRANSMIT DIVERSITY

BACKGROUND

1. Technical Field

The present disclosure relates generally to a communication device that supports simultaneous transmissions, and more particularly to a communication device that supports simultaneous transmissions using more than one transmit chain that can transmit in the same radio frequency band.

2. Description of the Related Art

Communication devices are increasingly being designed to support concurrent transmission via more than one transmit chain. For example, in moving from fourth generation long term evolved (LTE) radio access technology (RAT) to fifth generation new radio (5G NR) RAT, communication devices typically have increased a number of transmit chains that operate simultaneously. A typical LTE communication device has a maximum of two transmitters that are simultaneously active, one LTE transmitter and one Wi-Fi transmitter. A 5G NR communication device can have up to two 5G NR transmitters in multiple input multiple output (MIMO) operation, one LTE transmitter, and two Wi-Fi transmitters in MIMO operation. 5G non-standalone (NSA) mode is an option for 5G NR deployment. NSA mode is also referred to as evolved UMTS radio access network and new radio dual connectivity (ENDC) or merely "dual connectivity". Dual connectivity refers to possible concurrent transmission by an LTE transmitter and by a 5G NR transmitter. The multiple transmit chains may also be operated for spatial diversity, selecting antennas that are not blocked by proximity to a user.

Each transmit chain has a transmit power capability that is limited. Circumstances may arise where a transmit power level is required for an uplink signal that exceeds the transmit power capability of a single transmit chain. In an example, the communication device may be in a marginal coverage area due to distance from a base node. In another example, the communication device may be in marginal coverage area due to channel propagation degradation cause by obstructions or interference. In an additional example, the communication device may be operating in a hot ambient environment that limits the thermal management capability for each transmit chain.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
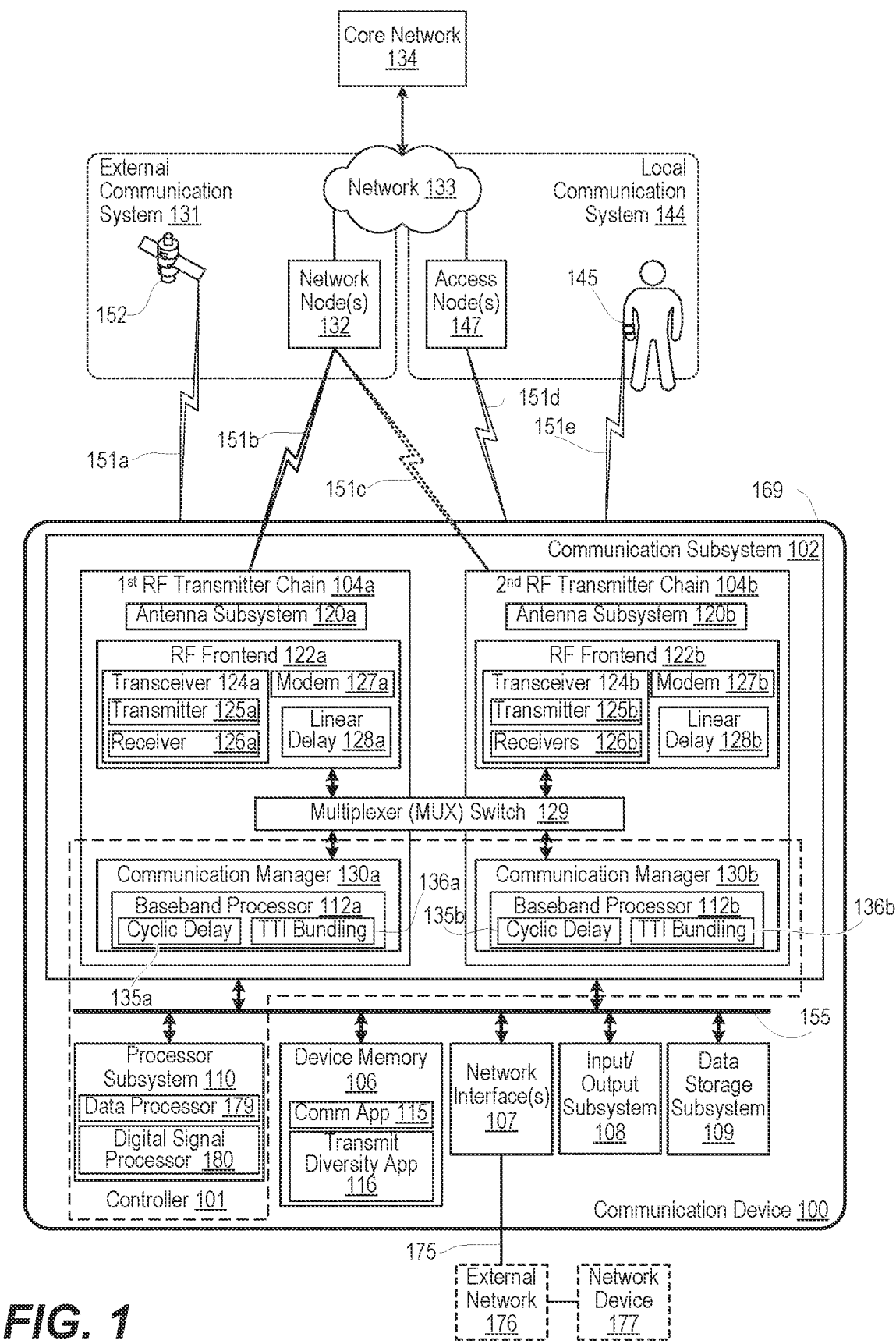
FIG. 1 depicts a functional block diagram of a communication environment including a communication device having a communication subsystem that supports multiple transmission uplinks that are configurable for power efficient transmit diversity, according to one or more embodiments.

According to a first aspect of the present disclosure, a communication device, a method and a computer program product provide increased transmit power levels by using transmit diversity, transmitting from more than one transmit chain of a communication device. The communication device determines appropriate instances to trigger transmit diversity for power efficient operation or to make available one or more of the transmit chains for another communication purpose. The communication device includes a communication subsystem having more than one transmitter chains including at least a first transmit chain and a second transmit chain. A controller of the communication device is communicatively coupled to the communication subsystem. The controller determines a first transmit power level required for an uplink signal. In response to determining that the first transmit power level is greater than an individual transmit power capability of either of the first transmit chain and the second transmit chain, the controller configures the first transmit chain and the second transmit chain for transmit diversity. In transmit diversity, the first and the second transmit chains respectively transmit a first uplink subcarrier and a second uplink subcarrier that sum to transmit an uplink channel having at least the first transmit power level. In response to determining that the first transmit power level is equal to or less than the transmit power capability of at least one of the first transmit chain and the second transmit chain, the controller configures a corresponding one of the first transmit chain and the second transmit chain to transmit the uplink channel with at least the first transmit power level.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of an electronic device in an operating environment within which the features of the present disclosure are advantageously implemented. In particular, communication device 100 is an example of an electronic device having communication subsystem 102 that supports multiple transmission uplinks by a plurality of radio frequency (RF) transmit chains 104a-104b configurable for transmit diversity. For clarity, first and second transmit chains 104a-104b are depicted; however, communication device 100 can include more than two RF transmit chains 104a-104b. In addition, the plurality of RF transmit chains 104a-104b can include different subsets that support concurrent transmission on different communication frequency bands. Communication device 100 may perform transmit diversity in two or more different communication frequency bands.

Communication device 100 can be one of a host of different types of devices, including but not limited to, a mobile cellular phone, satellite phone, or smart-phone, a laptop, a net-book, an ultra-book, a networked smartwatch or networked sports/exercise watch, and/or a tablet computing device or similar device that can include wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. In addition to communication subsystem 102, communication device 100 includes controller 101, device memory 106, network interface(s) 107, input/output (I/O) subsystem 108, and data storage subsystem 109 that are each managed by controller 101. Controller 101 may include or consist essentially of processor subsystem 110. In one or more embodiments, controller 101 also includes one or more baseband processors 112a-112b of respective RF transmit chains 104a-104b. Device memory 106 stores program code for applications, such as communication application 115, transmit diversity application 116, and other application(s). Device memory 106 further includes an operating system (OS), a firmware interface, such as basic input/output system (BIOS) or Uniform Extensible Firmware Interface (UEFI), and firmware.

Controller 101 includes processor subsystem 110, which executes program code to provide operating functionality of communication device 100. The functionality includes configuring communication subsystem 102 for transmit diversity to support increased transmit power, when necessary, and configuring communication subsystem 102 for power efficiency or additional uplink channels when transmit diversity is not necessary. The software and/or firmware modules have varying functionality when their corresponding program code is executed by processor subsystem 110 or secondary processing devices within communication device 100. Processor subsystem 110 of controller 101 can execute program code of communication application 115, transmit diversity application 116 and other application(s) to configure communication device 100 to perform specific functions. Device memory 106 can include data used by the applications. Transmit diversity application 116 monitors communication application 115 to determine what transmit uplinks are scheduled. Controller 101, executing transmit diversity application 116, can configure communication subsystem 102 in transmit diversity mode, operating first and second transmit chains 104a-104b to transmit a similar uplink subchannel to achieve increased transmit power. Controller 101, executing transmit diversity application 116, can also configure communication subsystem 102 in another mode that is not transmit diversity mode. In an example, each of first and second transmit chains 104a-104b may be independently activated to transmit or receive different communication channels or be deactivated when not scheduled.

Each RF transmit chain 104a-104b of communication subsystem 110 includes respective antenna subsystems 120a-120b that support various RF bands for wireless and cellular services. To support newer radio access technologies (RATs) and multi band operation, antenna subsystems 120a-120b may be configured for dual low band (2L) or quad low band (4L) multiple input multiple output (MIMO) operation that dictates that multiple antennas communicate on multiple bands simultaneously. In one or more embodiments, antenna subsystems 120a-120b supports lower frequency bands such as ultra-high band (UHB) and higher frequency bands, such as millimeter Wave (mmWave).

Each RF transmit chain 104a-104b includes respective RF frontends 122a-122b having one or more transceivers 124a-124b that includes one or more transmitters 125a-125b and one or more receivers 126a 126b. Multiplexer (MUX) switch 129 selectively connects communication managers 130a-130b to RF frontends 122a-122b. In one configuration, MUX switch 129 connects communication manager 130a to RF frontend 122a and connects communication manager 130b to RF frontend 122b such as for cyclic delay diversity or independent transmissions. In another configuration, MUX switch 129 connects either communication manager 130a to RF frontend 122a or connects communication manager 130b to RF frontend 122b with the other being inactive when not needed for transmit diversity or multiple independent transmissions. In an additional configuration such as for linear delay diversity, MUX switch 129 connects one of communication managers 130a-130b to both RF frontends 122a-122b with the other communication manager 130a-130b being inactive. Each RF transmit chain 104a-104b includes respective ones of one or more modems 127a-127b. Each RF transmit chain 104a-104b includes a respective linear delay diversity component 128a-128b to improve transmit diversity reception by using linear delay diversity. Delayed replicas of a signal are transmitted simultaneously from several antennas which are separated far enough in order to provide uncorrelated fading channels. A receiver receives the replicas as an equivalent single-input channel with increased frequency-selectivity that can be exploited by an equalizer for improved reception.

Each RF transmit chain 104a-104b includes respective communication manager 130a-130b having corresponding baseband processor 112a-112b. Baseband processors 112a-112b communicates with controller 101 and respective RF frontend 122a-122b. In one or more embodiments, baseband processor 112a-112b performs a primary or support function as part of controller 101. Communication subsystem 102 communicates with external communication system 131. Baseband processors 112a-112b operate in baseband frequency range to encode data for transmission and decode received data, according to a communication protocol. Modems 127a-127b modulate baseband encoded data from corresponding communication managers 130a-130b onto a carrier signal to provide a transmit signal that is amplified by power amplifiers in transmitters 125a-125b and delivered to antennas. Modems 127a-127b demodulate received signals from external communication system 131 detected by corresponding antenna subsystem 120a-120b. The received signal is amplified and filtered by receivers 126a 126b, which demodulate received encoded data from a received carrier signal. In an example, communication subsystem communicates with cellular network nodes 132 that are part of one or more radio access network (RANs) to connect to communication network(s) 133. Communication network(s) 133 may be communicatively connected to core network 134.

Baseband processors 112a-112b each include a respective cyclic delay diversity component 135a-135b to enhance transmit diversity. Cyclic delay diversity is a diversity scheme used in orthogonal frequency division multiplexing (OFDM)-based telecommunication systems to provide frequency diversity, which avoids inter-symbol interference. With cyclic delay diversity, a time delay is applied to the OFDM symbol (including the cyclic prefix) at either 135a or 135b after which the portion of the OFDM symbol which falls outside the symbol boundary is removed and placed at the beginning of the OFDM symbol. Baseband processors 112a-112b each include a transmission time interval (TTI) bundling code 136a-136b to code uplink signals for marginal cell coverage areas. Receiving a downlink control signal to use TTI bundling informs corresponding baseband processors 112a-112b that the error rate is above an error rate threshold for the uplink channel. In TTI bundling, communication device 100 sends the same data with different redundancy versions in physical uplink shared channel (PUSCH) in multiple consecutive sub-frames and gets only one acknowledged (ACK)/not acknowledged (NACK) for the entire bundle, reducing signaling overhead as well as increasing the likelihood of successful communication with low latency. Baseband processors 112a-112b can also monitor a rate of automatic repeat-requests (ARQs) in a hybrid automatic repeat-request (HARQ) on the downlink channel. When the rate of ARQs exceeds an ARQ error rate threshold, communication device 100 identifies a need for increased transmit power, which can be satisfied by transmit diversity.

In other applications, local communication system 144 can include localized or personal devices 145, such as a wireless headset, head mounted display, and a smart watch. Local communication systems 144 can further include access nodes 147 for wireless communication. Communication devices 100 can be provided communication services by wide area network(s) that are part of external communication system 131 and linked to access nodes 147. Wide area network(s) may also provide data services to communication network(s) 133 that provide communication service to communication device 100 via cellular network nodes 132.

Communication subsystem 102 can concurrently transmit multiple uplink channels and receive multiple downlink channels. In an example, communication subsystem 102 receives satellite broadcast signals 151a from GPS satellites 152. Communication subsystem 102 communicates with network nodes 132 via uplink/downlink channels 151b-151c. Communication subsystem 102 can communicate with access node 147 via transmit/receive signals 151d. Communication subsystem 102 communicates with localized or personal device 145 via transmit/receive signals 151e.

In one or more embodiments, controller 101, via communication subsystem 102, performs multiple types of cellular OTA or wireless communication with external communication system 131. Communication subsystem 110 can communicate via Bluetooth connection with one or more personal access network (PAN) devices such as localized or personal devices 145. Communication via Bluetooth connection includes both transmission and reception via a Bluetooth transceiver device. In one or more embodiments, communication subsystem 102 communicates with one or more locally networked devices via a wireless local area network (WLAN) link provided by access node 147. In one or more embodiments, access node 147 supports communication using one or more IEEE 802.11 WLAN protocols. Access node 147 is connected to wide area network(s), such as the Internet. In one or more embodiments, communication subsystem 102 communicates with GPS satellites 152 to obtain geospatial location information.

Data storage subsystem 109 of communication device 100 includes data storage device(s). Controller 101 is communicatively connected, via system interlink 155, to data storage device(s). Data storage subsystem 109 provides applications, program code, and stored data on nonvolatile storage that is accessible by controller 101. For example, data storage subsystem 109 can provide a selection of applications and computer data such as transmit diversity application 116. Transmit diversity application 116 can be loaded into device memory 106 for execution by controller 101. In one or more embodiments, data storage device(s) can include hard disk drives (HDDs), optical disk drives, and/or solid-state drives (SSDs), etc. Data storage subsystem 109 of communication device 100 can include removable storage device(s) (RSD(s)), which is received in an RSD interface. Controller 101 is communicatively connected to the RSD, via system interlink 155 and the RSD interface. In one or more embodiments, the RSD is a non-transitory computer program product or computer readable storage device. Controller 101 can access the RSD or data storage device(s) to provision communication device 100 with program code, such as code for transmit diversity application 116.

I/O subsystem 108 includes user interface components such as a display device that presents a user interface. I/O subsystem 108 may include acceleration/movement sensor(s), vibration output device, light output device, image capturing device(s), microphone(s), touch/haptic controls, and audio output device(s). I/O subsystem 108 also may include an I/O controller. The I/O controller provides communication and power signals to functional components described herein as part of communication subsystem 102, device memory 106, I/O subsystem 108, or data storage subsystem 109. The I/O controller connects to internal devices, which are internal to housing 169, and via an electrical cable to tethered peripheral devices, which are external to housing 169 of communication device 100. Internal devices can include computing, storage, communication, or sensing components depicted within housing 169. The I/O controller supports the necessary configuration of connectors, electrical power, communication protocols, and data buffering to act as an interface between internal devices and peripheral devices tethered by the electrical cable and other components of communication device 100 that use a different configuration for inputs and outputs.

Network interface(s) 107 can include a network interface controller (NIC) with a network connection/cable 175 connection to external network 176. Network interface(s) 107 support one or more network communication protocols. External network 176 can be a local area network (LAN), a campus area network (CAN), a metropolitan area network (MAN), or a wide area network (WAN). For example, network connection/cable 175 can be an Ethernet connection/cable. Network device 177 is communicatively coupled to wired area network 176.

Controller 101 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 101 includes processor subsystem 110, which includes one or more central processing units (CPUs), depicted as data processor 179. Processor subsystem 110 can include one or more digital signal processors 180 that are integrated with data processor 179. Processor subsystem 110 can include other processors that are communicatively coupled to data processor 179, such as baseband processors 112a-112b of corresponding communication managers 130a-130b. In one or embodiments that are not depicted, controller 101 can further include distributed processing and control components that are external to housing 169 or grouped with other components, such as I/O subsystem 108. Data processor 179 is communicatively coupled, via system interlink 155, to device memory 106. In one or more embodiments, data processor 179 is communicatively coupled via system interlink 155 to communication subsystem 102, I/O subsystem 108, and data storage subsystem 109.

System interlink 155 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 155 are illustrated in FIG. 1, it is to be understood that more, fewer, or different interconnections may be present in other embodiments.

According to aspects of the present disclosure, communication subsystem 102 has more than one transmit chains including at least first transmit chain 104a and second transmit chain 104b. Controller 101 is communicatively coupled to communication subsystem 102. Controller 101 determines a first transmit power level required for an uplink signal. In response to determining that the first transmit power level is greater than an individual transmit power capability of either of first transmit chain 104a and second transmit chain 104b, controller 101 configures first transmit chain 104a and second transmit chain 104b for transmit diversity to respectively transmit a first uplink subcarrier and a second uplink subcarrier that sum to transmit an uplink channel having at least the first transmit power level. In response to determining that the first transmit power level is equal to or less than the transmit power capability of at least one of first transmit chain 104a and second transmit chain 104b, controller 101 configures a corresponding one of first transmit chain 104a and second transmit chain 104b to transmit the uplink channel with at least the first transmit power level.

In one or more embodiments, in response to determining that the first transmit power level is greater than the transmit power capability of each of first transmit chain 104a and second transmit chain 104b, controller 101 configures first transmit chain 104a and second transmit chain 104b for transmit diversity by configuring first baseband processor 112a and second baseband processor 112b to transmit the uplink channel using cyclic delay diversity.

In one or more particular embodiments, controller 101 configures first transmit chain 104a and second transmit chain 104b for transmit diversity. In response to determining that the cyclic delay diversity provides a communication performance increase that is less than a threshold amount, controller 101 configures one of first baseband processor 112a and second baseband processor 112b to transmit the uplink channel using linear delay diversity. Controller 101 provides a baseband signal to first transmit chain 104a. A linear delay is applied to an entirety of the baseband signal to generate a linearly delayed baseband signal. The linearly delayed baseband signal is provided to second transmit chain 104b. Using linear delay diversity rather than cyclic delay diversity in certain instances avoids power consumption by another one of first baseband processor 112a and second baseband processor 112b.

In one or more embodiments, first transmit chain 104a includes at least one first antenna of a first antenna subsystem 120a. Second transmit chain 104b includes at least one second antenna of a second antenna subsystem 120b that is/are spatially separated from the at least one first antenna. To configure the corresponding one of first transmit chain 104a and second transmit chain 104b to transmit the uplink channel at the first transmit power level, controller 101 determines if one of: (i) the at least one first antenna; and (ii) the at least one second antenna is unblocked for spatial diversity. Controller 101 selects a corresponding one of first transmit chain 104a and second transmit chain 104b having a corresponding one of the at least one first antenna and the at least one second antenna that are unblocked. More generally, the first and second transmit chains may be connected to a first set of antennas of a first antenna subsystem 120a and a second set of antennas of a second antenna subsystem 120b. Controller 101 selects the best antenna from the first set of antennas as the first antenna and the best antenna from the second set of antennas as the second antenna. Controller 101 may determine a best antenna in part based on available antennas that are not blocked by proximity to a user. Controller 101 may determine a best antenna in part based on the available antenna having the highest antenna gain in a direction of an intended base node.

In one or more embodiments, communication device 100 is a battery-power user equipment (UE) configured to support a higher power class in addition to providing spatial diversity in the battery-power UE. Communication device 100 incorporates functionality of two transmit chains 104a-104b operating at lower individual power levels with individual antennas that transmit simultaneously. The sum of the radiated power is higher than each individual maximum transmit power, thereby potentially achieving more link margin. The two transmit chains 104a-104b transmit similar signals with the signal from the second transmit chain potentially delayed relative to the first transmit chain. In an example, the hardware architectures that are used for this implementation are generally used to support uplink multiple input multiple output (MIMO) and therefore each transmit chain 104a-104b has its own baseband signal processing and filtering.

Running all the additional baseband signal processing causes increased overhead and reduces efficiency compared to a situation where one transit chain can be used to reach the same combined power from two power amplifier chains. Therefore, it is desired that whenever a single power amplifier can be used to achieve the same output power, communication device 100 utilizes the single power amplifier chain to provide battery efficiency. This is generally the case when communication device 100 is operating at a power level at or below the next lower power class maximum power. Network node 132 may not know the exact transmit power level of communication device 100 and the dynamic nature of uplink power control may result in multiple crossing of this threshold. According to aspects of the present disclosure, communication device 100 minimizes use of transmit diversity to conserve power or to make available another uplink channel. In one or more embodiments, communication device 100 is configured to independently switch between transmit diversity mode and another mode in a transparent and independent nature from scheduling network node 132.

When UE requested transmit power is above the single power amplifier power class maximum power, the controller is configured to automatically switch to dual Transmit diversity. Similarly, when the UE actual power is lower than the next lower power class maximum power that is supported by a single power amplifier, the controller is configured to switch to a single transmit. This method is completely transparent and independent of the base station.

Figure 2:
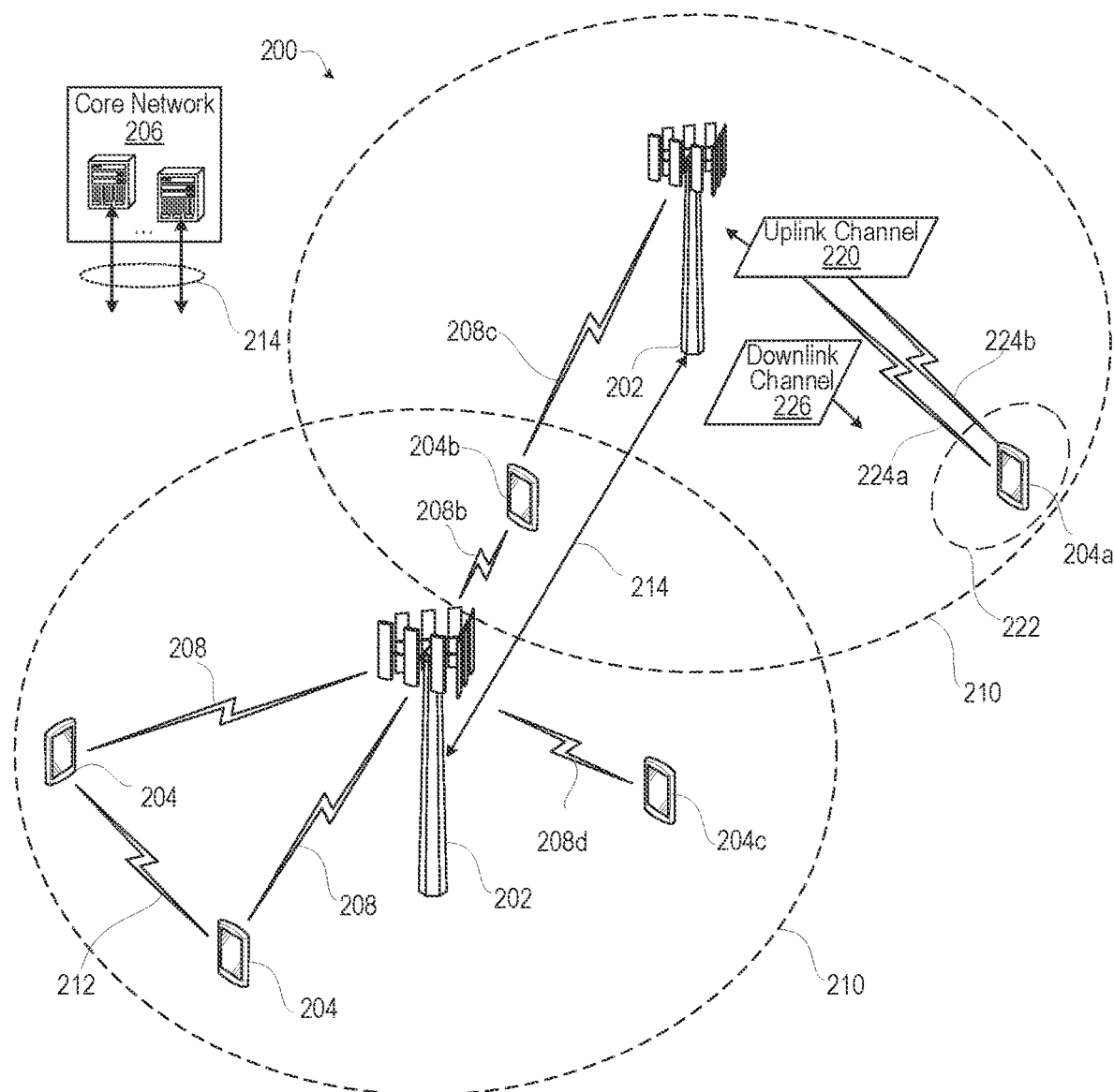
FIG. 2 depicts a wireless communications system that supports power efficient transmit diversity, according to one or more embodiments.

FIG. 2 illustrates an example of wireless communications system 200 that supports power efficient transmit diversity in accordance with aspects of the present disclosure. Wireless communications system 200 may include one or more base stations 202, one or more user equipments (UEs) 204, and core network 206. Wireless communications system 200 may support various radio access technologies. In some implementations, the wireless communications system 200 may be a 4G network, such as an LTE network or an LTE-Advanced (LTE-A) network. In some other implementations, the wireless communications system 200 may be a 5G network, such as a new radio (NR) network. In other implementations, wireless communications system 200 may be a combination of a 4G network and a 5G network. Wireless communications system 200 may support radio access technologies beyond 5G. Additionally, wireless communications system 200 may support different transmission modes, such as time division multiple access (TDMA), frequency division multiple access (FDMA), or code division multiple access (CDMA), etc.

One or more base stations 202 may be dispersed throughout a geographic region to form wireless communications system 200. One or more of base stations 202 described herein may be, may include, or may be referred to as a base transceiver station, an access point, a NodeB, an eNodeB (eNB), a next-generation NodeB (gNB), or other suitable terminology. Base station 202 and UE 204 may communicate via communication link 208, which may be a wireless or wired connection. For example, base station 202 and UE 204 may wirelessly communication over a user unit (Uu) interface.

Base station 202 may provide geographic coverage area 210 for which base station 202 may support services (e.g., voice, video, packet data, messaging, broadcast, etc.) for one or more UEs 204 within geographic coverage area 210. For example, base station 202 and UE 204 may support wireless communication of signals related to services (e.g., voice, video, packet data, messaging, broadcast, etc.) according to one or multiple radio access technologies. In some implementations, base station 202 may be moveable, for example, a satellite associated with a non-terrestrial network. In some implementations, different geographic coverage areas 210 associated with the same or different radio access technologies may overlap, but the different geographic coverage areas 210 may be associated with different base stations 202. Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

One or more UEs 204 may be dispersed throughout a geographic region of wireless communications system 200. UE 204 may include or may be referred to as a mobile device, a wireless device, a remote device, a handheld device, or a subscriber device, or some other suitable terminology. In some implementations, UE 204 may be referred to as a unit, a station, a terminal, or a client, among other examples. Additionally, or alternatively, the UE 204 may be referred to as an Internet-of-Things (IoT) device, an Internet-of-Everything (IoE) device, or machine-type communication (MTC) device, among other examples. In some implementations, UE 204 may be stationary in wireless communications system 200. In some other implementations, UE 204 may be mobile in wireless communications system 200.

One or more UEs 204 may be devices in different forms or having different capabilities. UE 204 may be capable of communicating with various types of devices, such as base stations 202, other UEs 204, or network equipment (e.g., core network 206, a relay device, an integrated access and backhaul (IAB) node, or another network equipment), as shown in FIG. 2. Additionally, or alternatively, UE 204 may support communication with other base stations 202 or UEs 204, which may act as relays in the wireless communications system 200.

UE 204 may also be able to support wireless communication directly with other UEs 204 over communication link 212. For example, UE 204 may support wireless communication directly with another UE 204 over a device-to-device (D2D) communication link. In some implementations, such as vehicle-to-vehicle (V2V) deployments, vehicle-to-everything (V2X) deployments, or cellular-V2X deployments, the communication link 212 may be referred to as a sidelink. For example, a UE 204 may support wireless communication directly with another UE 204 over a PC5 interface. UEs 204 can use transmit diversity according to aspects of the present disclosure to increase transmit power levels in a power efficient manner.

Base station 202 may support communications with core network 206, or with another base station 202, or both. For example, base station 202 may interface with core network 206 through one or more backhaul links 214 (e.g., via an S1, N2, N2, or another network interface). The base stations 202 may communication with each other over backhaul links 214 (e.g., via X2, Xn, or another network interface). Core network 206 may support user authentication, access authorization, tracking, connectivity, and other access, routing, or mobility functions. Core network 206 may be an evolved packet core (EPC), or a 5G core (5GC)

According to aspects of the present disclosure, one or more UEs 204a-204c incorporate components and features of communication device 100 of FIG. 1 and can provide increased transmit power for uplink channel 220 using transmit diversity, when required. One or more UEs 204a-204c can also be configured to efficiently use power or support additional different uplink signals when transmit diversity is not required. In an example, UE 204a is in marginal coverage area 222 that requires a transmit power level achieved by transmit diversity of two uplink subcarriers 224a-224b. In one or more embodiments, UE 204a determines the transmit power level based on receiving downlink channel 226. In an example, UE 204a receives, in the downlink channel 226, a control signal for scheduling an uplink channel 220. The control signal can schedule one or more of resource blocks, can include a power control command, and can specify a power control step size for the uplink channel. UE 204a determines the transmit power level based on a number of resource blocks, the power control command, and the power control step size to be concurrently transmitted in uplink channel 220.

In one or more embodiments, UE 204a determines a need for increasing the transmit power level using transmit diversity based on an error rate of the uplink channel 220. In an example, UE 204a monitors an error rate of the uplink channel. In response to determining that the error rate is greater than a first error threshold, UE 204a configures the first transmit chain 104a and the second transmit chain 104b (FIG. 1) for transmit diversity. UE 204a continues to monitor the error rate of the uplink channel. UE 204a performs the configuring of only one of first transmit chain 104a and second transmit chain 104b to transmit the uplink channel with the first transmit power level, in response to determining that the error rate of the uplink channel is less than or equal to the first error threshold. In an example, second and third UEs 204b-204c are depicted as not in transmit diversity mode (i.e., not transmitting the same transmit subcarriers to one base station 202). Second UE 204b is concurrently transmitting uplink communication channel 208b to one base station 202 and different uplink communication channel 208c to another base station 202. Third UE 204c is transmitting one uplink communication channel 208d to one base station 202.

In one or more embodiments, UE 204a monitors the error rate of the uplink channel based on automated repeat requests (ARQs) contained in a downlink channel. In one or more embodiments, in monitoring the error rate of the uplink channel, UE 204a identifies transmission time interval (TTI) bundling contained in a downlink channel that indicates that the error rate of the uplink channel is greater than a pre-set error threshold that is utilized in determining when to trigger transmit diversity. UE 204a identifies a lack of TTI bundling in the downlink channel indicating that the error rate of the uplink channel is no longer greater than the error threshold, which thus triggers discontinuation of transmit diversity.

In one or more embodiments, UE 204a receives a downlink channel from one base station 202. UE 204a monitors received signal strength of reference signals on the downlink channel for an indication of a propagation condition indicating that the communication device is in a marginal coverage area. The received signal strength may be based on at least one of received signal strength indication (RSSI), reference signal received power (RSRP), and reference signal received quality (RSRQ). Alternatively, based on measurements of reference signals, the UE may estimate the downlink path loss from the gNB in order to identify marginal coverage conditions. In response to identifying the indication, UE 204a configures first transmit chain 104a and second transmit chain 104b (FIG. 1) for transmit diversity to transmit the uplink channel with a second transmit power level that is greater than the first transmit power level.

Figure 3:
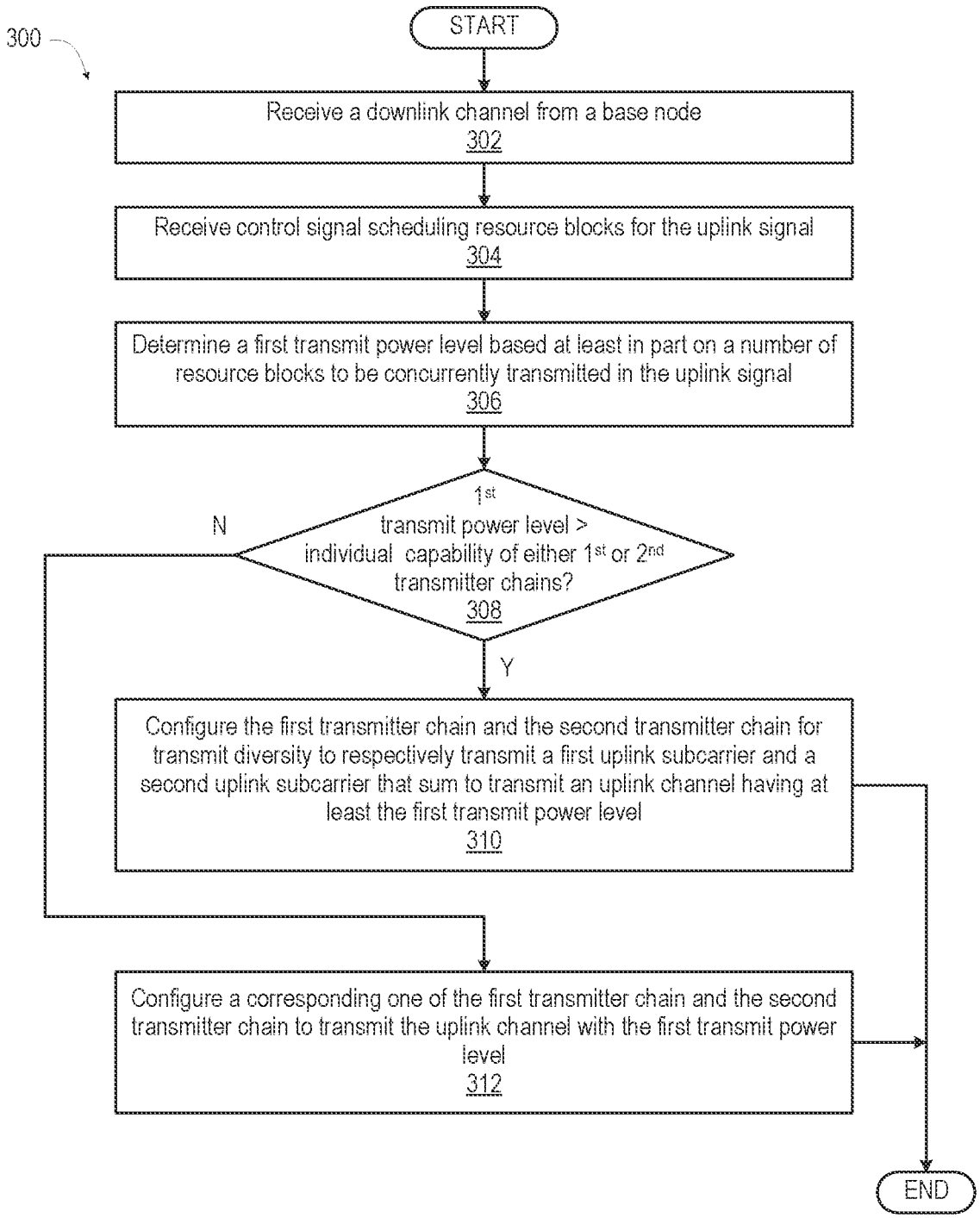
FIG. 3 presents a flow diagram of a method performed by a communication device for managing power efficient transmit diversity of two or more transmit chains, according to one or more embodiments.
Figure 4:
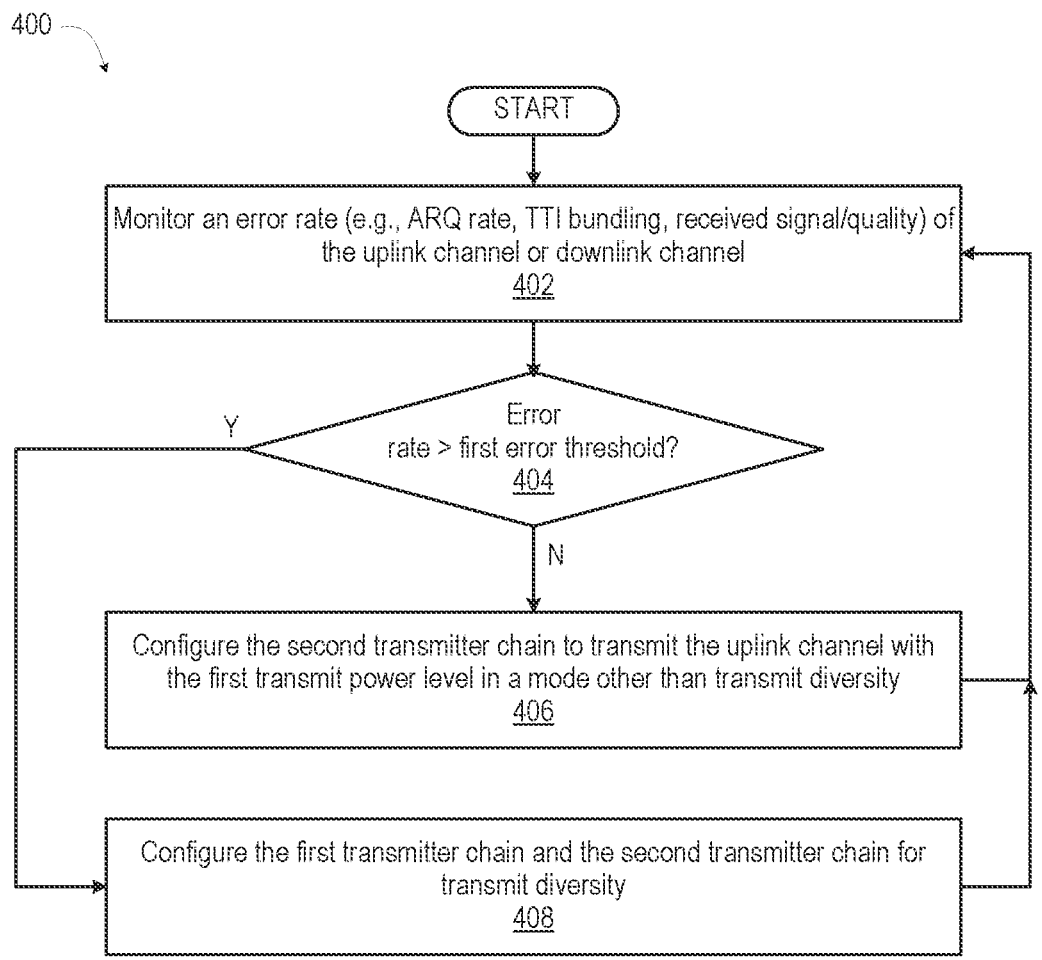
FIG. 4 presents a flow diagram of a method performed by the communication device to provide additional functionality to the method of FIG. 3 by triggering transmit diversity in response to an error rate of the uplink channel, according to one or more embodiments.
Figure 5:
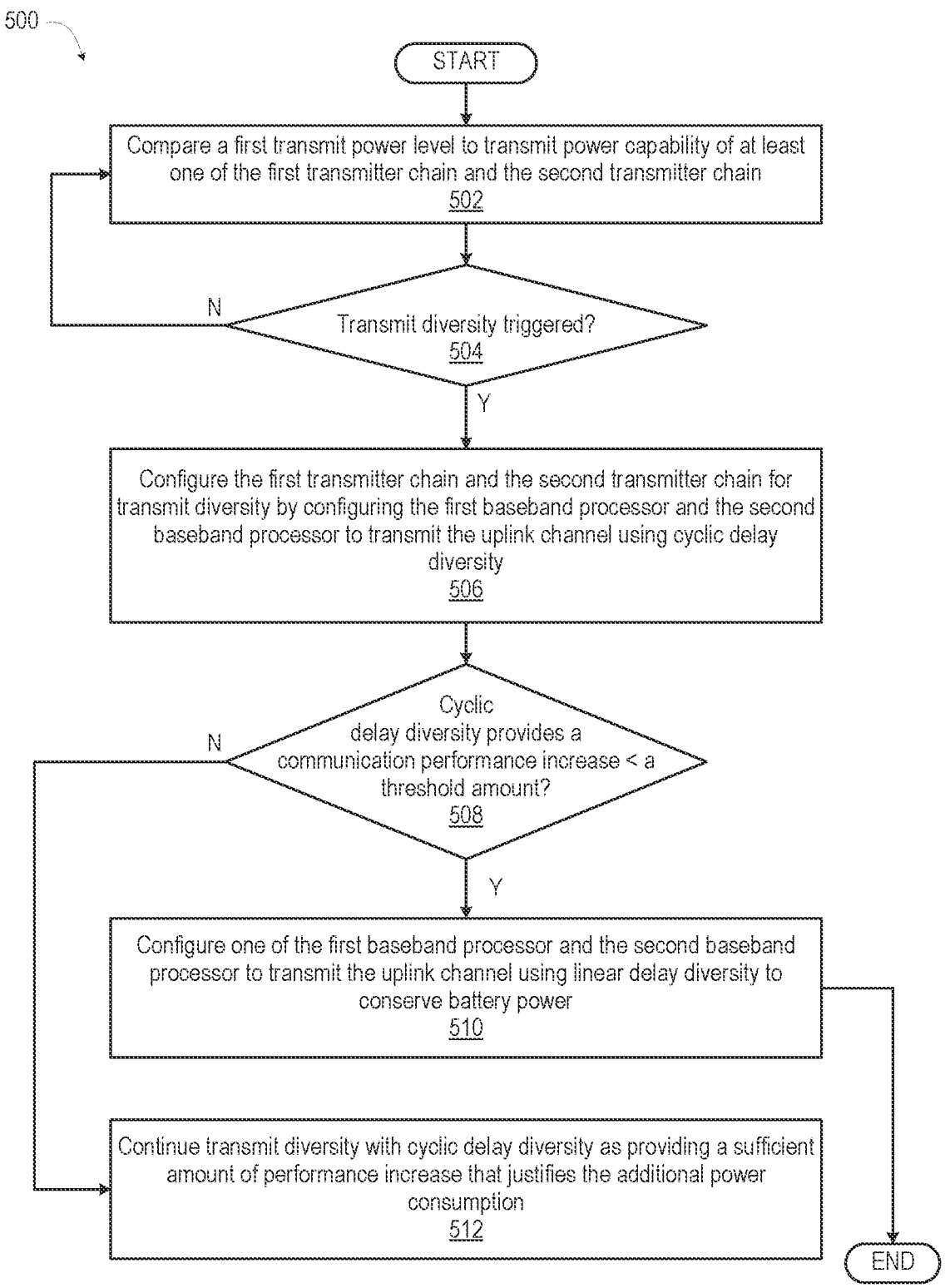
FIG. 5 presents a flow diagram of a method performed by the communication device to provide additional functionality to the method of FIG. 3 by performing delay diversity that is power efficient, according to one or more embodiments.

FIG. 3 presents a flow diagram of method 300 performed by a communication device for efficiently managing transmit diversity of two or more transmit chains. FIG. 4 presents a flow diagram of method 400 performed by the communication device to provide additional functionality to method 300 of FIG. 3 by triggering transmit diversity in response to an error rate of the uplink channel. FIG. 5 presents a flow diagram of method 500 performed by the communication device to provide additional functionality to method 300 of FIG. 3 by performing delay diversity that is power efficient. The descriptions of method 300 (FIG. 3), method 400 (FIG. 4). and method 500 (FIG. 5) are provided with general reference to the specific components illustrated within the preceding FIGS. 1-2. Specific components referenced in method 300 (FIG. 3), method 400 (FIG. 4). and method 500 (FIG. 5) may be identical or similar to components of the same name used in describing preceding FIGS. 1-2. In one or more embodiments, controller 101 configures communication device 100 (FIG. 1) or UE 204a (FIG. 2) to provide functionality of method 300 (FIG. 3), method 400 (FIG. 4). and method 500 (FIG. 5).

With reference to FIG. 3, method 300 includes receiving a downlink channel from a base node (block 302). Method 300 includes receiving, within the downlink channel, control signal scheduling resource blocks for the uplink signal (block 304). Method 300 includes determining a first transmit power level, based at least in part on a number of resource blocks to be concurrently transmitted in the uplink signal (block 306). Method 300 includes determining whether the first transmit power level is greater than an individual transmit power capability of either of a first transmit chain and a second transmit chain of the communication device (decision block 308). In response to determining that the first transmit power level is greater than an individual transmit power capability of either of a first transmit chain and a second transmit chain of a communication device, method 300 includes configuring the first transmit chain and the second transmit chain for transmit diversity to respectively transmit a first uplink subcarrier and a second uplink subcarrier that sum to transmit an uplink channel having at least the first transmit power level (block 310). Then method 300 ends. In response to determining that the first transmit power level is equal to or less than the transmit power capability of at least one of the first transmit chain and the second transmit chain, method 300 includes configuring a corresponding one of the first transmit chain and the second transmit chain to transmit the uplink channel with the first transmit power level (block 312).

In some cases, the communication device can determine that for a time interval into the future, that the required transmit power will be less than the transmit power capability of at least one of the first transmit chain and a second transmit chain. For example, based on the transmit power for the current subframe, the communication device can determine the power that is transmitted per resource block. By multiplying the transmit power per resource block by the maximum number of resource blocks, the UE can determine if the maximum power for the current power control state will exceed maximum power for both the first transmit chain and the second transmit chain. In some cases, the maximum number of resource blocks will be the maximum number of resource blocks for the configured carrier bandwidth. In some cases, the maximum number of resource blocks will be the maximum number of resource blocks for a bandwidth part. If the maximum power for the current power control state is less than the maximum of the maximum power for the first and second transmit chains, then let B1>0 denote this difference in dB. For accumulated power control, the maximum power increase is 3 dB. Let N1 denote the floor of B1/3, and note that with accumulated power control, both transmit chains will not be needed until at least N1 subframes into the future. Conversely, if the maximum power is greater than the maximum power for the first and second transmit chains, let B2>0 denote this difference. Since the largest power decrease for accumulated power control is 1 dB, both transmit chains may be needed for at least B2 subframes into the future. It should be noted that these calculations can also be modified to adjust for the modulation and coding scheme and the number of bits per resource element.

In one or more embodiments, in configuring the corresponding one of the first transmit chain and the second transmit chain to transmit the uplink channel at the first transmit power level, method 300 further comprises determining if one of: (i) at least one first antenna of the first transmit chain; and (ii) at least one second antenna of the second transmit chain is unblocked for spatial diversity. The at least one second antenna is spatially separated from the at least one first antenna. Method 300 includes selecting a corresponding one of the first transmit chain and the second transmit chain having a corresponding one of the at least one first antenna and the at least one second antenna that are unblocked.

In one or more embodiments, in response to determining that a transmit diversity condition that triggered the transmit diversity no longer exists while the first transmit chain and the second transmit chain are configured for transmit diversity, method 300 includes continuing utilizing transmit diversity until a hysteresis condition is satisfied from among (i) determining that a monitored parameter has returned to less than or equal to a second threshold value that is less than a first threshold at which transmit diversity was triggered; and (ii) determining that the transmit diversity condition no longer exists for at least a predefined period of time. In an example, the predefined period of time can be 5 seconds or a minute. In another example, the predefined period of time is based on velocity of the communication device with a faster velocity resulting in a shorter predefined period of time.

With reference to FIG. 4, method 400 includes monitoring an error rate (e.g., ARQ rate, TTI bundling, received signal/quality) of the uplink channel or downlink channel (block 402). Method 400 includes determining whether the error rate is greater than a first error threshold (decision block 404). In response to determining that the error rate is less than or equal to the first error threshold, method 400 includes configuring of one of the first transmit chain and the second transmit chain to transmit the uplink channel with the first transmit power level in a mode other than transmit diversity (block 406). Method 400 returns to block 402. In response to determining that the error rate is greater than a first error threshold, method 400 includes configuring the first transmit chain and the second transmit chain for transmit diversity (block 408). Then method 400 returns to block 402.

In one or more embodiments, method 400 includes monitoring the error rate of the uplink channel based on automated repeat requests (ARQs) contained in a downlink channel. In one or more embodiments, method 400 includes monitoring the error rate of the uplink channel by: (i) identifying transmission time interval (TTI) bundling contained in a downlink channel that indicates that the error rate of the uplink channel is greater than the error threshold triggering transmit diversity; and (ii) identifying a lack of TTI bundling in the downlink channel indicating that the error rate of the uplink channel is no longer greater than the error threshold triggering discontinuation of transmit diversity.

In one or more embodiments, method 400 includes receiving a downlink channel from a base node. Method 400 includes monitoring received signal strength of the downlink channel for an indication of a propagation condition indicating that the communication device is in a marginal coverage area based on at least one of received signal strength indication (RSSI), reference signal received power (RSRP), and reference signal received quality (RSRQ). In response to identifying the indication, method 400 includes configuring the first transmit chain and the second transmit chain for transmit diversity to transmit the uplink channel with a second transmit power level that is at least equal to or greater than the first transmit power level.

With reference to FIG. 5, method 500 includes comparing a first transmit power level to transmit power capability of at least one of the first transmit chain and the second transmit chain (block 502). Method 500 includes determining whether configuring the first transmit chain and the second transmit chain for transmit diversity is triggered based on the first transmit power level exceeding the transmit power capability (decision block 504). In response to determining that configuring the first transmit chain and the second transmit chain for transmit diversity is not triggered, method 500 returns to decision block 502. In response to determining that configuring the first transmit chain and the second transmit chain for transmit diversity is triggered, method 500 includes configuring the first transmit chain and the second transmit chain for transmit diversity by configuring the first baseband processor and the second baseband processor to transmit the uplink channel using cyclic delay diversity (block 506).

Method 500 includes determining whether the cyclic delay diversity provides a communication performance increase that is less than a threshold amount (decision block 508). In response to determining that the cyclic delay diversity provides a communication performance increase that is less than a threshold amount, method 500 includes configuring one of the first baseband processor and the second baseband processor to transmit the uplink channel using linear delay diversity to conserve battery power (block 510). Then method 500 ends. In response to determining that the cyclic delay diversity provides a communication performance increase that is equal to or greater than the threshold amount, method 500 includes continuing transmit diversity with cyclic delay diversity, as providing a sufficient amount of performance increase that justifies the additional power consumption (block 512). Then method 500 ends.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
a communication subsystem having more than one transmit chains comprising at least a first transmit chain and a second transmit chain; and
a controller communicatively coupled to the communication subsystem, and which:
determines a first transmit power level required for an uplink signal based on a number of resource blocks to be concurrently transmitted in the uplink signal, a power control command, and a power control step size;
in response to determining that the first transmit power level is greater than an individual transmit power capability of either of the first transmit chain and the second transmit chain, configures the first transmit chain and the second transmit chain for transmit diversity to respectively transmit a first uplink subcarrier and a second uplink subcarrier that sum to transmit an uplink channel having at least the first transmit power level, wherein the controller:
configures the first transmit chain and the second transmit chain to transmit the uplink channel using cyclic delay diversity;
determines whether the cyclic delay diversity provides a communication performance increase that is less than a threshold amount; and
in response to determining that the cyclic delay diversity provides a communication performance increase that is less than a threshold amount, configures the first transmit chain and the second transmit chain to transmit the uplink channel using linear delay diversity; and in response to determining that the first transmit power level is equal to or less than the transmit power capability of at least one of the first transmit chain and the second transmit chain, configures a corresponding one of the first transmit chain and the second transmit chain to transmit the uplink channel with at least the first transmit power level.

2. The communication device of claim 1, wherein:
the communication subsystem comprises at least one receiver that receives a downlink channel from a base node; and
the controller:
receives, in the downlink channel, control signal scheduling an uplink channel comprising: (i) the number of resource blocks; (ii) the power control command; and (iii) the power control step size for the uplink channel.

3. The communication device of claim 1, wherein:
the first transmit chain comprises at least one first antenna;
the second transmit chain comprises at least one second antenna that are spatially separated from the at least one first antenna; and
to configure the corresponding one of the first transmit chain and the second transmit chain to transmit the uplink channel at the first transmit power level, the controller:
determines if one of: (i) the at least one first antenna; and (ii) the at least one second antenna is unblocked for spatial diversity; and
selects a corresponding one of the first transmit chain and the second transmit chain having a corresponding one of the at least one first antenna and the at least one second antenna that are unblocked.

4. The communication device of claim 1, wherein:
the first transmit chain and the second transmit chain comprise a respective one of a first baseband processor and a second baseband processor; and
in response to determining that the first transmit power level is greater than the transmit power capability of at least one of the first transmit chain and the second transmit chain:
configures the first transmit chain and the second transmit chain for transmit diversity by first configuring the first baseband processor and the second baseband processor to transmit the uplink channel using cyclic delay diversity.

5. The communication device of claim 4, wherein to configure the communication subsystem to transmit the uplink channel using linear delay diversity, the controller configures one of the first baseband processor and the second baseband processor to transmit the uplink channel using linear delay diversity by:
providing a baseband signal to the first transmit chain;
applying a linear delay to an entirety of the baseband signal to generate a linearly delayed baseband signal; and
providing the linearly delayed baseband signal to the second transmit chain, in order to avoid power consumption by another one of the first baseband processor and the second baseband processor.

6. The communication device of claim 1, wherein the controller:
monitors an error rate of the uplink channel; and
in response to determining that the error rate is greater than a first error threshold:
configures the first transmit chain and the second transmit chain for transmit diversity;
continues to monitor the error rate of the uplink channel; and
performs the configuring of one of the first transmit chain and the second transmit chain to transmit the uplink channel with the first transmit power level in response to determining that the error rate of the uplink channel is less than or equal to the first error threshold.

7. The communication device of claim 6, wherein the controller monitors the error rate of the uplink channel based on automated repeat requests (ARQs) contained in a downlink channel.

8. The communication device of claim 6, wherein, in monitoring the error rate of the uplink channel, the controller:
identifies transmission time interval (TTI) bundling contained in a downlink channel that indicates that the error rate of the uplink channel is greater than an error threshold triggering transmit diversity; and
identifies a lack of TTI bundling in the downlink channel indicating that the error rate of the uplink channel is no longer greater than the error threshold triggering discontinuation of transmit diversity.

9. The communication device of claim 1, wherein:
the communication subsystem comprises at least one receiver that receives a downlink channel from a base node; and
the controller:
monitors received signal strength of the downlink channel for an indication of a propagation condition indicating that the communication device is in a marginal coverage area based on at least one of received signal strength indication (RSSI), reference signal received power (RSRP), and reference signal received quality (RSRQ); and
in response to identifying the indication, configures the first transmit chain and the second transmit chain for transmit diversity to transmit the uplink channel with a second transmit power level that is greater than the first transmit power level.

10. The communication device of claim 1, wherein the controller:
in response to determining that a transmit diversity condition that triggered the transmit diversity no longer exists while the first transmit chain and the second transmit chain are configured for transmit diversity:
continues utilizing transmit diversity until a condition is satisfied from among at least one of: (i) determining that a monitored parameter has returned to less than or equal to a second threshold value that is less than a first threshold at which transmit diversity was triggered; and (ii) determining that the transmit diversity condition no longer exists for at least a predefined period of time, wherein the predefined period of time can be a set time value and the predefined period of time can be based on a velocity of movement of the communication device.

11. A method comprising:
determining a first transmit power level required for an uplink signal based on a number of resource blocks to be concurrently transmitted in the uplink signal, a power control command, and a power control step size;
in response to determining that the first transmit power level is greater than an individual transmit power capability of either of a first transmit chain and a second transmit chain of a communication device, configuring the first transmit chain and the second transmit chain for transmit diversity to respectively transmit a first uplink subcarrier and a second uplink subcarrier that sum to transmit an uplink channel having at least the first transmit power level, wherein the configuring further comprises:
  configuring the first transmit chain and the second transmit chain to transmit the uplink channel using cyclic delay diversity;
  determining whether the cyclic delay diversity provides a communication performance increase that is less than a threshold amount; and
  in response to determining that the cyclic delay diversity provides a communication performance increase that is less than a threshold amount, configures one of the first transmit chain and the second transmit chain to transmit the uplink channel using linear delay diversity; and
  in response to determining that the first transmit power level is equal to or less than the transmit power capability of at least one of the first transmit chain and the second transmit chain, configuring a corresponding one of the first transmit chain and the second transmit chain to transmit the uplink channel with at least the first transmit power level.

12. The method of claim 11, further comprising:
receiving a downlink channel from a base node;
receiving, in the downlink channel, control signal scheduling the uplink channel comprising: (i) the number of resource blocks; (ii) the power control command; and (iii) the power control step size for the uplink channel.

13. The method of claim 11, wherein configuring the corresponding one of the first transmit chain and the second transmit chain to transmit the uplink channel at the first transmit power level comprises:
  determining if one of: (i) at least one first antenna of the first transmit chain; and (ii) at least one second antenna of the second transmit chain is unblocked for spatial diversity, the at least one second antenna being spatially separated from the at least one first antenna; and
  selecting a corresponding one of the first transmit chain and the second transmit chain having a corresponding one of the at least one first antenna and the at least one second antenna that are unblocked.

14. The method of claim 11, further comprising:
in response to determining that the first transmit power level is greater than the transmit power capability of at least one of the first transmit chain and the second transmit chain:
configuring the first transmit chain and the second transmit chain for transmit diversity by first configuring a first baseband processor of the first transmit chain and a second baseband processor of the second transmit chain to transmit the uplink channel using cyclic delay diversity.

15. The method of claim 14, wherein configuring one of the first transmit chain and the second transmit chain to transmit the uplink channel using linear delay diversity comprises:
  configuring one of the first baseband processor and the second baseband processor to transmit the uplink channel using linear delay diversity by:
    providing a baseband signal to the first transmit chain;
    applying a linear delay to an entirety of the baseband signal to generate a linearly delayed baseband signal; and
    providing the linearly delayed baseband signal to the second transmit chain, in order to avoid power consumption by another one of the first baseband processor and the second baseband processor.

16. The method of claim 11, further comprising:
monitoring an error rate of the uplink channel based on automated repeat requests (ARQs) contained in a downlink channel; and
in response to determining that the error rate is greater than a first error threshold:
  configuring the first transmit chain and the second transmit chain for transmit diversity;
  continuing to monitor the error rate of the uplink channel; and
  performing the configuring of one of the first transmit chain and the second transmit chain to transmit the uplink channel with the first transmit power level in response to determining that the error rate of the uplink channel is less than or equal to the first error threshold.

17. The method of claim 11, further comprising:
receiving a downlink channel from a base node;
configuring the first transmit chain and the second transmit chain for transmit diversity in response to identifying transmission time interval (TTI) bundling contained in the downlink channel that indicates that an error rate of the uplink channel is greater than an error threshold triggering transmit diversity; and
configuring of one of the first transmit chain and the second transmit chain to transmit the uplink channel with the first transmit power level in response to identifying a lack of TTI bundling in the downlink channel indicating that the error rate of the uplink channel is no longer greater than the error threshold triggering discontinuation of transmit diversity.

18. The method of claim 11, wherein:
receiving a downlink channel from a base node;
monitoring received signal strength of the downlink channel for an indication of a propagation condition indicating that the communication device is in a marginal coverage area based on at least one of received signal strength indication (RSSI), reference signal received power (RSRP), and reference signal received quality (RSRQ);
in response to identifying the indication, configuring the first transmit chain and the second transmit chain for transmit diversity to transmit the uplink channel with a second transmit power level that is greater than the first transmit power level; and
in response to not identifying the indication, configuring of one of the first transmit chain and the second transmit chain to transmit the uplink channel with the first transmit power level.

19. The method of claim 11, further comprising:
in response to determining that a transmit diversity condition that triggered the transmit diversity no longer exists while the first transmit chain and the second transmit chain are configured for transmit diversity:
continuing utilizing transmit diversity until a condition is satisfied from among at least one of: (i) determining that a monitored parameter has returned to less than or equal to a second threshold value that is less than a first threshold at which transmit diversity was triggered; and (ii) determining that the transmit diversity condition no longer exists for at least a predefined period of time, wherein the predefined period of time can be a set time value and the predefined period of time can be based on a velocity of movement of the communication device.

20. A computer program product comprising:

a computer readable storage device; and program code on the computer readable storage device that when executed by a processor associated with a communication system, the program code enables a communication device to provide functionality of:

determining a first transmit power level required for an uplink signal based on a number of resource blocks to be concurrently transmitted in the uplink signal, a power control command, and a power control step size;

in response to determining that the first transmit power level is greater than an individual transmit power capability of either of a first transmit chain and a second transmit chain of the communication device, configuring the first transmit chain and the second transmit chain for transmit diversity to respectively transmit a first uplink subcarrier and a second uplink subcarrier that sum to transmit an uplink channel having at least the first transmit power level, wherein the communication device is further configured to provide functionality of:

configuring the first transmit chain and the second transmit chain to transmit the uplink channel using cyclic delay diversity;

determining whether the cyclic delay diversity provides a communication performance increase that is less than a threshold amount; and in response to determining that the cyclic delay diversity provides a communication performance increase that is less than a threshold amount, configures one of the first transmit chain and the second transmit chain to transmit the uplink channel using linear delay diversity; and in response to determining that the first transmit power level is equal to or less than the transmit power capability of at least one of the first transmit chain and the second transmit chain, configuring a corresponding one of the first transmit chain and the second transmit chain to transmit the uplink channel with at least the first transmit power level.

* * * * *